(12) United States Patent
Mattina (10) Patent No.: US 7,551,564 B2
(45) Date of Patent: Jun. 23, 2009

(54) FLOW CONTROL METHOD AND APPARATUS FOR SINGLE PACKET ARRIVAL ON A BIDIRECTIONAL RING INTERCONNECT

(75) Inventor: Matthew Mattina, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 981 days.

(21) Appl. No.: 10/855,355

(22) Filed: May 28, 2004

(65) Prior Publication Data

US 2005/0265238 A1 Dec. 1, 2005

(51) Int. Cl.
*G01R 31/08* (2006.01)
(52) U.S. Cl. ...................... 370/238; 370/452
(58) Field of Classification Search .................. None
See application file for complete search history.

(56) References Cited

U.S. PATENT DOCUMENTS

| 6,959,358 | B2 * | 10/2005 | Regev et al. | 711/108 |
|---|---|---|---|---|
| 7,016,969 | B1 * | 3/2006 | Uzun et al. | 709/233 |
| 7,054,951 | B1 * | 5/2006 | Kao et al. | 709/242 |
| 7,142,504 | B1 * | 11/2006 | Uzun | 370/224 |
| 7,212,490 | B1 * | 5/2007 | Kao et al. | 370/222 |
| 7,339,941 | B2 * | 3/2008 | Twomey | 370/401 |
| 2001/0022745 | A1 * | 9/2001 | Lee | 365/194 |
| 2003/0200342 | A1 * | 10/2003 | Greenblat et al. | 709/251 |
| 2004/0008721 | A1 * | 1/2004 | Ying et al. | 370/460 |
| 2004/0012600 | A1 * | 1/2004 | Deering et al. | 345/506 |
| 2004/0124877 | A1 * | 7/2004 | Parkes | 326/41 |

OTHER PUBLICATIONS

Luiz Andre Barroso, et al., Impact of Chip-Level Integration on Performance of OLTP Workloads, Sixth International Symposium on High-Performance Computer Architecture (HPCA), Jan. 2000.
Luiz Andre Barroso, et al., Piranha: A Scalable Architecture Based on Single-Chip Multiprocessing, In Proceedings of the 27th Annual International Symposium on Computer Architecture, Jun. 2000.
Motorola Architecture Guide C-5e/C-3e Network Processor Silicon Revision B0, Chapter 8: Internal Buses, Copyright 2003 Motorola, Inc.
Leonidas Georgiadis, et al., Throughput Properties of Fair Policies in Ring Networks, IEEE/ACM Transactions On Networking, vol. 1, No. 6, Dec. 1993.

* cited by examiner

*Primary Examiner*—Bob A Phunkulh
(74) *Attorney, Agent, or Firm*—Kenyon & Kenyon LLP (57) ABSTRACT

Embodiments of the present invention are related in general to data flow control in a network and in particular to packet flow control in a bidirectional ring interconnect. An embodiment of a method includes sending packets on the bidirectional ring interconnect in a first direction or on the bidirectional ring interconnect in a second direction, opposite to the first direction, between source and destination nodes on a semiconductor chip during a clock cycle based on a distance between the two nodes. An embodiment of an apparatus includes a semiconductor chip comprising a bidirectional ring interconnect and a plurality of nodes coupled to the bidirectional ring interconnect, where the bidirectional ring interconnect may transport packets in a clockwise or counterclockwise direction during a clock cycle based on the distance between source and destination nodes. Embodiments ensure single packet arrival at the destination node during any clock cycle. Exemplary applications include chip multiprocessing.

42 Claims, 5 Drawing Sheets

FLOW CONTROL METHOD AND APPARATUS FOR SINGLE PACKET ARRIVAL ON A BIDIRECTIONAL RING INTERCONNECT

FIELD OF THE INVENTION

Embodiments of the present invention are related in general to data flow control in a network and in particular to packet flow control in a bidirectional ring interconnect.

BACKGROUND

Flow control mechanisms in computer networks govern the transfer of packets from a source node to a destination node. Typical flow control mechanisms include wiring and logic to handle multiple packets arriving concurrently at the destination node. There are several drawbacks with such mechanisms.

First, if the destination node can simultaneously process fewer packets than can arrive in a clock cycle, additional hardware may be required to buffer the arriving packets until the destination node can process them. Alternatively, the destination node may be able to process as many packets simultaneously as can arrive in a cycle, again requiring significant additional hardware. This additional hardware poses a particular problem on semiconductor chips where space is extremely limited.

Second, arbitration logic may be required at the destination node to determine an order to accept the packets. In addition to increasing the complexity of the logic, the packet latency may significantly increase due to the arbitration. Instead of a packet being accepted during the clock cycle that it arrives, the packet has to wait. As a result, the overall performance of the system is reduced.

In ring topologies, concurrent multiple packet arrival is a particular concern. If a packet has to wait on a ring until the destination node accepts the packet, packets behind the waiting packet may be blocked from advancing on the ring. As a result, unnecessary congestion can occur at the destination node. This condition significantly increases packet latency and reduces peak throughput of the ring.

Accordingly, there is a need in the art to overcome the drawbacks caused by concurrent multiple packet arrival, particularly in ring topologies.

DETAILED DESCRIPTION

Embodiments of the present invention may provide a method for single packet arrival during a clock cycle at a destination node on a bidirectional ring interconnect. In one embodiment, the method may include sending packets from a source node to a destination node on a semiconductor chip's bidirectional ring interconnect during a predetermined and/or dynamically determined clock cycle based on the distance (measured in terms of clock cycles) between the two nodes. In this embodiment, the method may also include, if the distance between the two nodes is an even number, sending the packets on the ring interconnect in a clockwise direction during an even clock cycle and sending the packets in a counterclockwise direction during an odd clock cycle. The method may also include, if the distance between the two nodes is an odd number, sending the packets in a clockwise direction during an odd clock cycle and sending the packets in a counterclockwise direction during an even clock cycle.

Embodiments of the present invention may also provide a semiconductor chip including a bidirectional ring interconnect and nodes coupled to the bidirectional ring interconnect, where the bidirectional ring interconnect may transport packets between source and destination nodes. Each node may also include queues to hold selective packets prior to transport based on whether the distance the packets will travel is an even or odd number and whether the direction the packets will travel is clockwise or counterclockwise.

Embodiments of the present invention may advantageously ensure single packet arrival during a clock cycle at a destination node, thereby overcoming the problems of multiple packet arrival mechanisms. In particular, these embodiments may avoid the additional hardware and arbitration logic complexity of typical flow control mechanisms. Moreover, these embodiments may ensure packet arrival on a bidirectional ring interconnect without significantly increasing packet latency or reducing peak throughput on the bidirectional ring interconnect. Accordingly, packet flow control at the destination node may be simplified. These embodiments may be particularly useful in on-chip bidirectional ring interconnects for chip multiprocessing.

Figure 1:
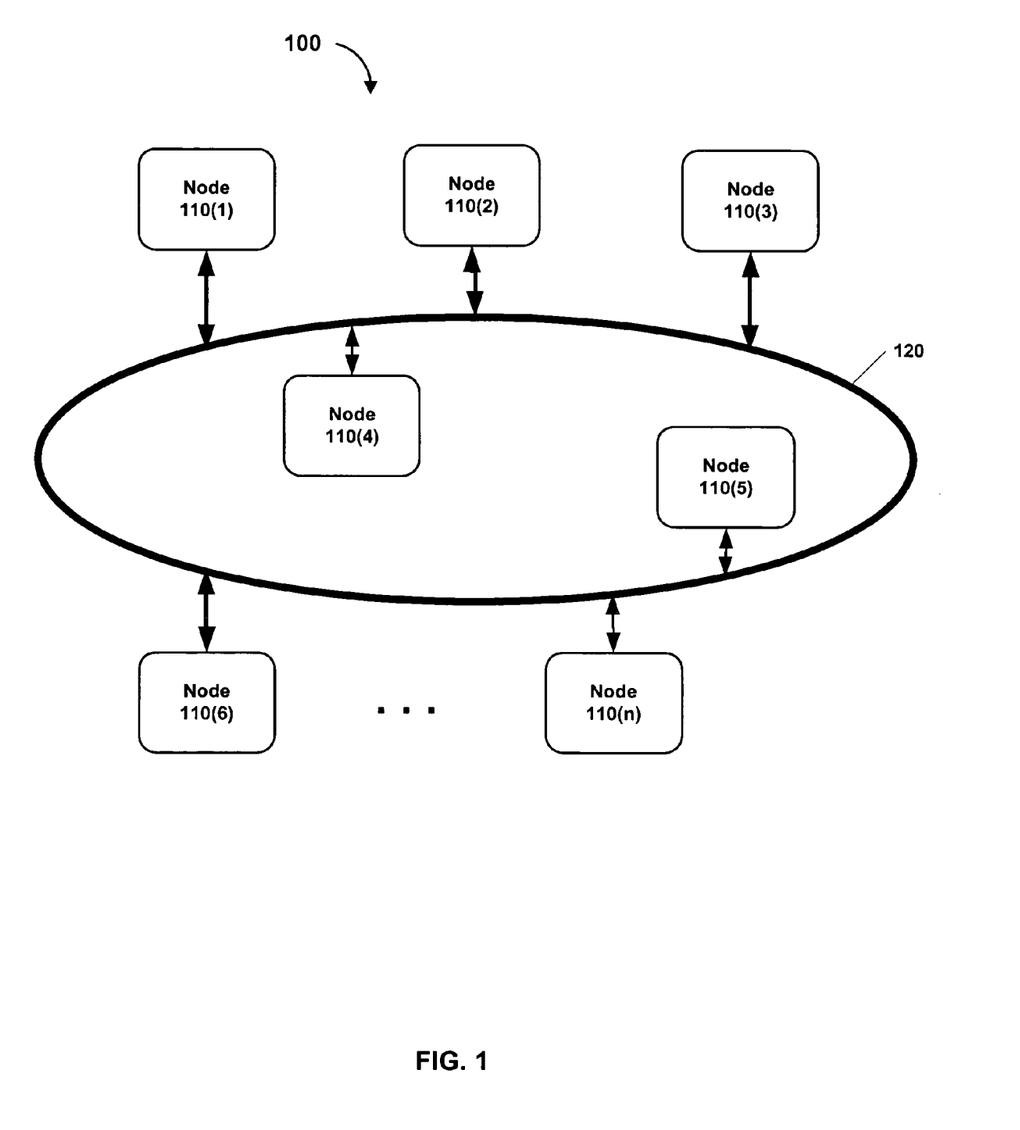
FIG. 1 is a semiconductor chip including multiple nodes coupled to a single bidirectional ring interconnect, in accordance with an embodiment of the present invention.

FIG. 1 is a semiconductor chip including multiple nodes coupled to a bidirectional ring interconnect, in accordance with an embodiment to the present invention. Nodes 110(1) through 110(n) may be connected to bidirectional ring interconnect 120 at various access points or stops. Packets may travel between nodes 110(1) through 110(n) on interconnect 120 in either a clockwise or counterclockwise direction.

Nodes 110(1) through 110(n) may include a processor, cache bank, memory interface, global coherence engine interface, input/output interface, and any other such packet-handling component found on a semiconductor chip.

In FIG. 1, in an embodiment of the present invention, nodes 110(1) through 110(n) may be implemented as cache bank nodes by logically dividing a single large shared cache into subsets. Each cache bank node may include a portion of the address space in the single cache, and may independently service block requests (read, write, invalidate, etc) for the portion of the address space in the single cache. On interconnect 120, each cache bank node may have its own access point or stop.

In FIG. 1, interconnect 120 may include multiple unidirectional wires (not shown), where a first set of the unidirectional wires may transport packets in a clockwise direction and a second set may transport packets in a counterclockwise direction. Each set of unidirectional wires may have either a specific purpose (e.g., sending address commands) or a general purpose (e.g., supporting multiple packet types (address request, data, cache coherence protocol message, etc.)). Alternatively, each set of unidirectional wires may be designated to transport a single packet type.

Alternatively, in FIG. 1, interconnect 120 may include multiple bidirectional wires capable of transporting packets in both directions. In this alternate embodiment, the semiconductor chip may include switching logic to switch each wire to a desired direction to transport packets during a particular transaction.

Interconnect 120 may transport packets at various rates. For example, interconnect 120 may transport packets at a rate of one or more nodes per clock cycle or one node every two or more clock cycles. Many factors may determine the transport rate including the amount of traffic, the clock rate, the distance between nodes, etc. Generally, a node waits to inject a packet onto interconnect 120 until any packet already on interconnect 120 and at the node passes the node.

Figure 2:
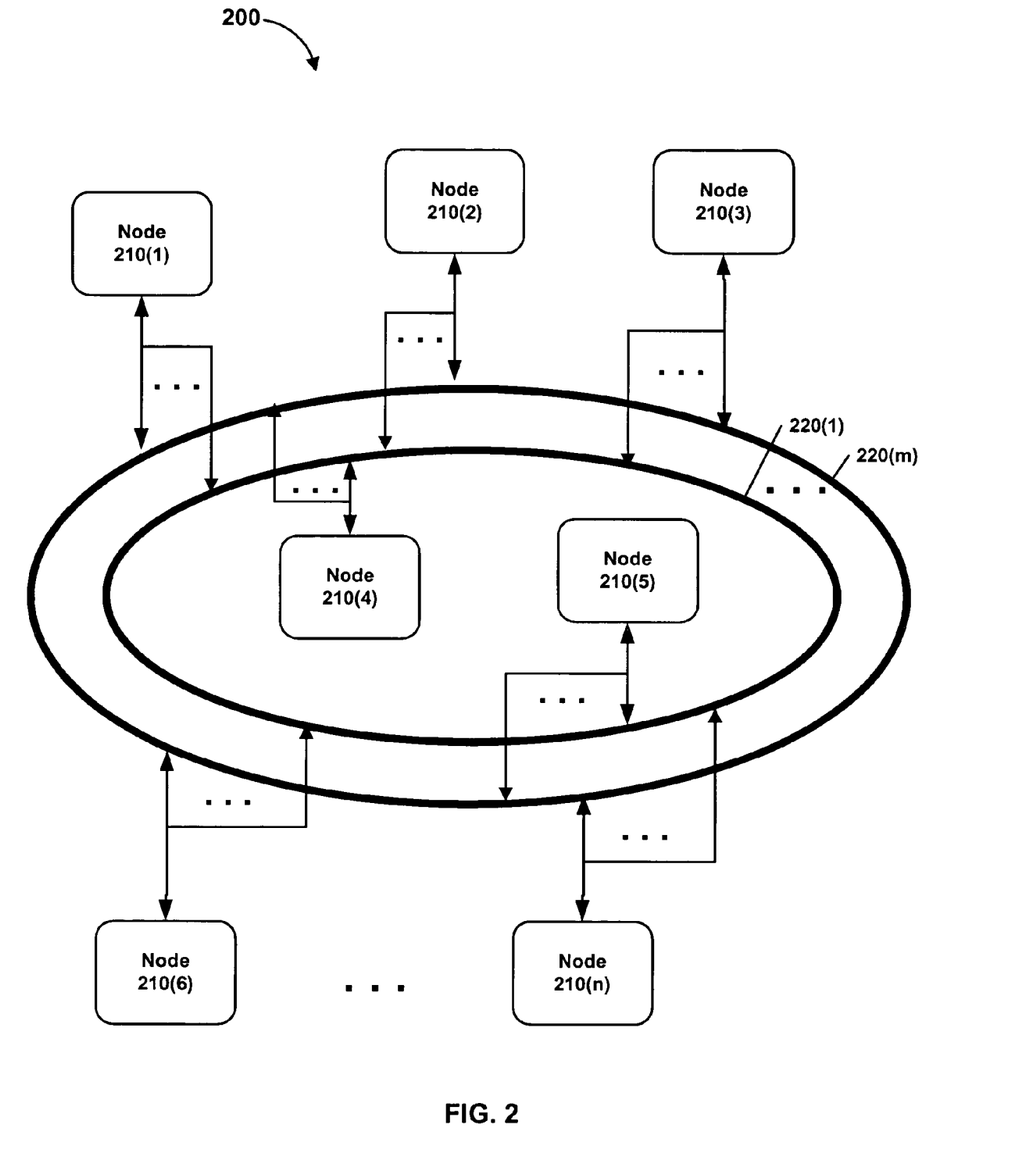
FIG. 2 is a semiconductor chip including multiple nodes coupled to multiple unidirectional and/or bidirectional ring interconnects, in accordance with an embodiment of the present invention.

FIG. 2 is a semiconductor chip including multiple nodes coupled to multiple ring interconnects, in accordance with an embodiment of the present invention. Nodes 210(1) through 210(n) may be connected to ring interconnects 220(1) through 220(m) at various access points or stops. Each node may select any of ring interconnects 220(1) through 220(m) on which to transport packets to another node.

In one embodiment, all the interconnects in FIG. 2 may be unidirectional, where some interconnects transport packets in only a clockwise direction and other interconnects transport packets in only a counterclockwise direction.

In an alternate embodiment, some interconnects in FIG. 2 may be unidirectional and others bidirectional. In this alternate embodiment, some of the unidirectional interconnects may transport packets in only a clockwise direction and others may transport packets in only a counterclockwise direction. The bidirectional interconnects may transport packets in both directions, consistent with the operation of the bidirectional interconnect of FIG. 1.

Figure 3:
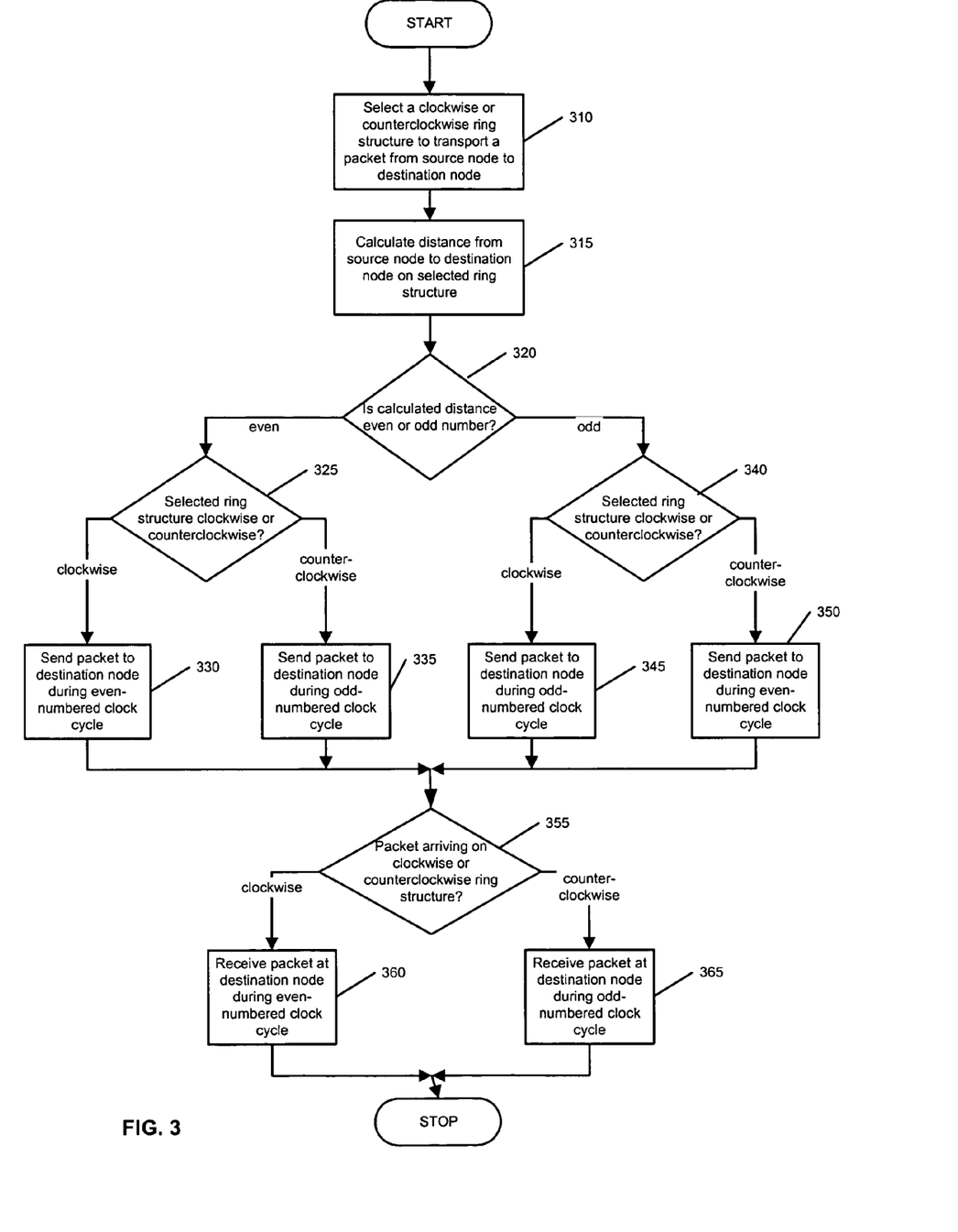
FIG. 3 is a flowchart of a method according to an embodiment of the present invention.

FIG. 3 is a flowchart of a method according to an embodiment of the present invention. In FIG. 3, the method may ensure single packet arrival during a given clock cycle at a destination node on a bidirectional ring interconnect. In one embodiment, nodes may send and receive packets in either a clockwise or counterclockwise direction on a bidirectional ring interconnect. The bidirectional ring interconnect may comprise a first set of wires that transports packets in the clockwise direction (which may comprise a first ring structure) and a second set of wires that transports packets in the counterclockwise direction (which may comprise a second ring structure). The bidirectional ring interconnect may be thought of as a series of slots, each of which carries a packet from one access point or stop to the next during each clock cycle.

In FIG. 3, a source node, for example node 210(1) of FIG. 2, may select (310) a clockwise or counterclockwise ring structure on which to transport a packet from a source node to a destination node coupled to the ring structures. In one embodiment, the selection may be based on the number of slots to be traversed on both ring structures to reach the destination node. For example, if the number of slots to traverse on the clockwise ring structure is less than the number of slots to traverse on the counterclockwise ring structure, the source node may select the clockwise ring structure.

Alternatively, the selection may be based on the number of nodes to be traversed on both ring structures to reach the destination node, where the ring structure may be selected on which the packet is to traverse less nodes. In another alternate embodiment, the selection may be based on the number of clock cycles to traverse both ring structures, where the selected ring structure may take less clock cycles to transport the packet. Alternatively, the selection may be based on the amount of traffic on the ring structures, where the selected ring structure may have less traffic. Any other such criteria may be used to determine the selection.

In FIG. 3, the source node may calculate (315) a distance to the destination node on the selected ring structure. The distance may be calculated as the number of clock cycles to reach the destination node. In an alternate embodiment, the distance may be calculated as the number of nodes to reach the destination node. Any other such criteria may be used to determine the distance between the source and destination nodes.

In FIG. 3, the source node may determine (320) whether the calculated distance is an even or odd number of clock cycles away. If the calculated distance is an even number of clock cycles, the source node may determine (325) whether the selected ring structure is the clockwise or counterclockwise ring structure. If the selected ring structure is the clockwise one, the source node may send (330) the packet to the destination node during an even-numbered clock cycle to ensure that the packet arrives at the destination node during an even-numbered clock cycle. If the selected ring structure is the counterclockwise one, the source node may send (335) the packet to the destination node during an odd-numbered clock cycle to ensure that the packet arrives at the destination node during an odd-numbered clock cycle.

In FIG. 3, if the source node determines (320) that the calculated distance is an odd number of clock cycles away, the source node may determine (340) whether the selected ring is the clockwise or counterclockwise ring structure. If the selected ring structure is the clockwise one, the source node may send (345) the packet to the destination node during an odd-numbered clock cycle to ensure that the packet arrives at the destination node during an even-numbered clock cycle. If the selected ring structure is the counterclockwise one, the source node may send (350) the packet to the destination node during an even-numbered clock cycle to ensure that the packet arrives at the destination node during an odd-numbered clock cycle.

Table 1 illustrates the logic used in the method for sending packets described in FIG. 3. The table entries give the source node's send clock cycles of the different scenarios. For a given transport direction (clockwise or counterclockwise) and an even or odd distance from the source node to the destination node, the table entries indicate whether the source node may send the packet during an even- or an odd-numbered clock cycle.

TABLE 1

Packet Sending Rules

| Ring Direction | Distance from source to destination | |
|---|---|---|
| | Even | Odd |
| Clockwise | even | odd |
| Counterclockwise | odd | even |

In FIG. 3, the destination node may determine (355) on which of the clockwise and counterclockwise ring structures the packet is arriving. For example, the destination node may poll both the clockwise and counterclockwise ring structures to determine on which ring structure the packet is arriving. In this embodiment of the present invention, the packet may arrive on the clockwise ring structure and be received (360) at the destination node during even-numbered clock cycles. The packet may arrive on the counterclockwise ring structure and be received (365) at the destination node during odd-numbered clock cycles. Other embodiments may be contemplated in which packets may arrive.

The underlying rule implemented by embodiments of the present invention is that a destination node may receive a packet from a clockwise ring structure only during an even-numbered clock cycle and from a counterclockwise ring structure only during an odd-numbered clock cycle. This may ensure that only a single packet arrives during any clock cycle at the destination node. The source node's sending rules may be formulated to satisfy the underlying rule.

Suppose, in accordance with an embodiment of the present invention, for example, that source node n(i) calculates a distance between it and destination node n(j), where the distance is d(i,j). If destination node n(j) is an even number of clock cycles away from source node n(i) on the clockwise ring structure, node n(i) may send the packet to node n(j) on an even-numbered clock cycle C because C+d(i,j), the arrival clock cycle, is an even number, i.e., an even number plus an even number equals an even number. Thus, the underlying rule may be satisfied.

Similarly, in accordance with an embodiment of the present invention, for example, if destination node n(j) is an odd number of clock cycles away from source node n(i) on the clockwise ring structure, node n(i) may send the packet to node n(j) on an even-numbered clock cycle C because C+d(i,j), the arrival clock cycle, is an odd number, i.e., an even number plus an odd number equals an odd number. Thus, the underlying rule may again be satisfied.

In an alternate embodiment, the bidirectional ring interconnect may comprise two unidirectional ring interconnects to transport packets in opposite directions. In this embodiment, one of the unidirectional ring interconnects to transport packets in the clockwise direction may comprise the first ring structure and the other of the unidirectional ring interconnects to transport packets in the counterclockwise direction may comprise the second ring structure.

In other alternate embodiments, the bidirectional ring interconnect may comprise one unidirectional ring interconnect and a bidirectional ring interconnect or two bidirectional ring interconnects. Similar to previously described embodiments, one of the interconnects may comprise the first ring structure and the other may comprise the second ring structure.

It is to be understood that the bidirectional ring interconnect is not limited to one or two ring structures, but may include any number of ring structures to transport packets in multiple directions, not limited to clockwise and counterclockwise.

Embodiments of a semiconductor chip may implement a method according to embodiments of the present invention. In one embodiment, the semiconductor chip may include a bidirectional ring interconnect and nodes coupled to the bidirectional ring interconnect, where the bidirectional ring interconnect may send packets to a destination node during a predetermined and/or dynamically determined clock cycle based on a distance to the destination node. Each node may include a subtractor, a programmable finite state machine, or a processor to calculate the distance to the destination node in either a clockwise or counterclockwise direction.

In the embodiment, each node may also include multiple queues to selectively store packets to be sent to destination nodes, where each queue may store packets based on the direction in and the clock cycle during which the packets are to be transported. In one embodiment, each node may maintain two queues of packets to be sent for each of the clockwise and counterclockwise directions on the ring interconnect, for a total of four queues. A first queue may store packets to be sent in the clockwise direction during even-numbered clock cycles. A second queue may store packets to be sent in the clockwise direction during odd-numbered clock cycles. Similarly, a third queue may store packets to be sent in the counterclockwise direction during even-numbered clock cycles. A fourth queue may store packets to be sent in the counterclockwise direction during odd-numbered clock cycles.

Figure 4:
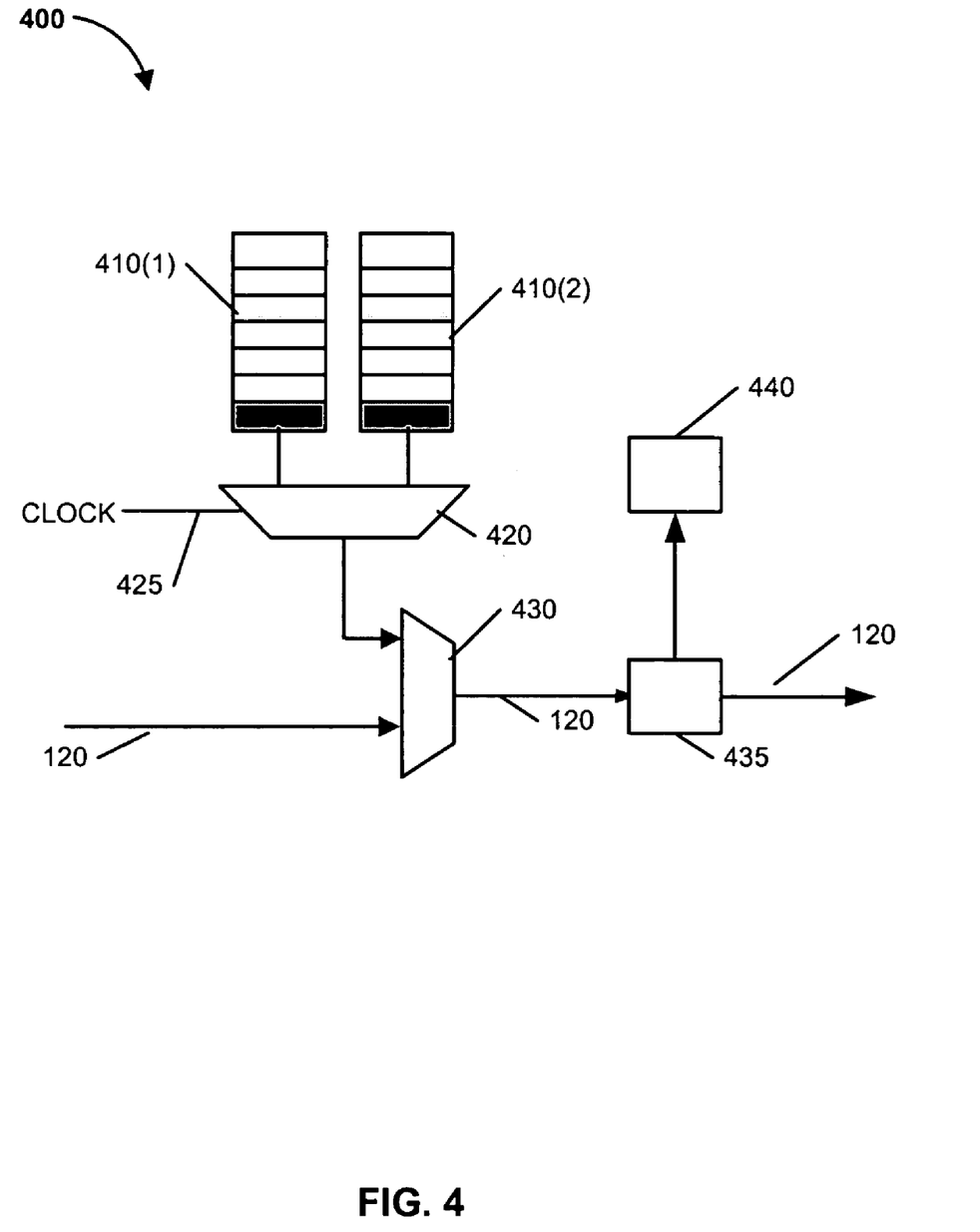
FIG. 4 is a packet queue structure coupled to a bidirectional ring interconnect, in accordance with an embodiment of the present invention.

FIG. 4 is a packet queue structure according to an embodiment of the present invention. In FIG. 4, two queues are shown to transport packets in the clockwise direction on the bidirectional ring interconnect. A similar configuration (not shown) may be used for packet transport in the counterclockwise direction.

In FIG. 4, first queue 410(1) may hold packets to be sent in the clockwise direction during an even-numbered clock cycle (packets whose destination is an even distance away). Second queue 410(2) may hold packets to be sent in the clockwise direction during an odd-numbered clock cycle (packets whose destination is an odd distance away).

In FIG. 4, queue multiplexor 420 may receive a clock signal on clock signal line 425 to trigger the selection of one of queues 410(1) and 410(2). If the clock signal indicates that the current clock cycle is even, queue multiplexor 420 may select a packet from first queue 410(1). If the clock signal indicates that the current clock cycle is odd, queue multiplexor 420 may select a packet from second queue 410(2).

If a packet does not arrive at the node on interconnect 120 during the current clock cycle, node multiplexor 430 may inject the packet from the selected queue onto interconnect 120. If a packet does arrive at the node during the current clock cycle, node multiplexor 430 may allow the arriving packet to proceed. If this node is the destination node, switching logic 435 may direct the arriving packet into the node, e.g., node processor 440, or any node component. If this node is not the destination node, switching logic 435 may direct the arriving packet to continue on interconnect 120. Node multiplexor 430 may wait until the next appropriate even or odd clock cycle to inject the packet from the queue after the arriving packet passes. Switching logic 435 may direct the injected packet from the queue to traverse interconnect 120.

It is to be understood that switching logic or any such hardware and/or software capable of directing a packet to a node or on the interconnect may be used.

When traffic is uniform on the ring interconnect, half of the destination nodes may be an even distance away and half may be an odd distance away. If an unoccupied slot arrives at a node during an even-numbered clock cycle, the slot may be filled with a packet from the even queue and if the unoccupied slot arrives at a node in an odd cycle, the slot may be filled with a packet from the odd queue. Thus, regardless of when an empty slot arrives, the node may be able to inject a waiting packet, if it has one, to maintain complete utilization of the ring interconnect, high peak throughput, and low packet latency.

Embodiments of the present invention may be coupled to a system including other semiconductor chips via a communication bus. The bus may transport packets according to embodiments of the present invention when the packets arrive or leave the semiconductor chips. In one embodiment, the bus may transport rejected packets from the semiconductor chips if the rejected packets are not accepted after a certain time period, e.g., after traversing nodes on the semiconductor chip's ring interconnect multiple times or after a number of clock cycles has elapsed.

Figure 5:
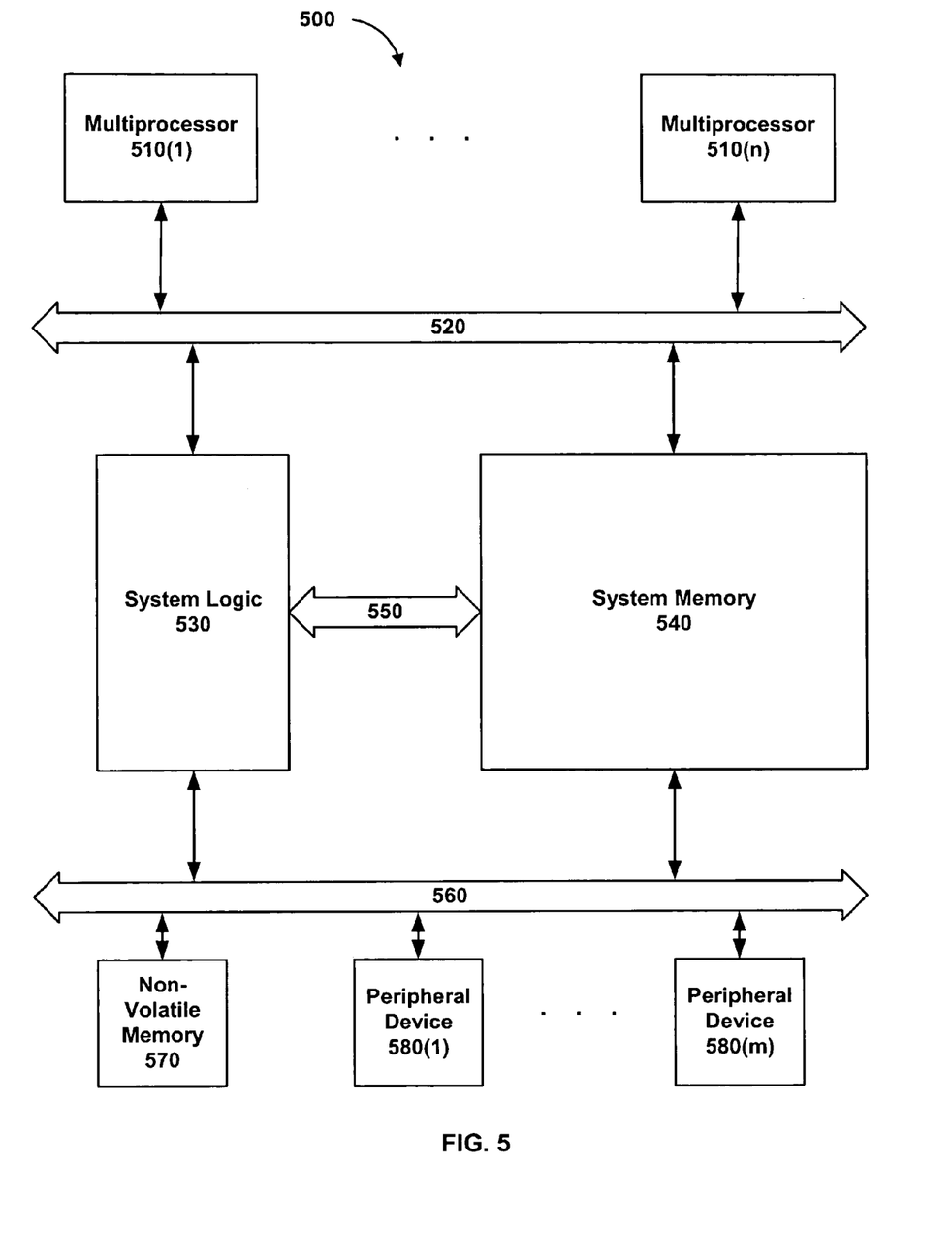
FIG. 5 is a block diagram of a computer system for implementing embodiments of the present invention.

FIG. 5 is a block diagram of a computer system, which may include an architectural state, including one or more multiprocessors and memory for use in accordance with an embodiment of the present invention. In FIG. 5, a computer system 500 may include one or more multiprocessors 510(1)-510(n) coupled to a processor bus 520, which may be coupled to a system logic 530. Each of the one or more multiprocessors 510(1)-510(n) may be N-bit processors and may include a decoder (not shown) and one or more N-bit registers (not shown). In accordance with an embodiment of the present invention, each of the one or more multiprocessors 510(1)-510 (n) may include a bidirectional ring interconnect (not shown) to couple to the N-bit processors, the decoder, and the one or more N-bit registers.

System logic 530 may be coupled to a system memory 540 through a bus 550 and coupled to a non-volatile memory 570 and one or more peripheral devices 580(1)-580 (m) through a peripheral bus 560. Peripheral bus 560 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 570 may be a static memory device such as a read only memory (ROM) or a flash memory. Peripheral devices 580(1)-580(m) may include, for example, a keyboard; a mouse or other pointing devices; mass storage devices such as hard disk drives, compact disc (CD) drives, optical disks, and digital video disc (DVD) drives; displays and the like.

Embodiments of the present invention may be implemented using any type of computer, such as a general-purpose microprocessor, programmed according to the teachings of the embodiments. The embodiments of the present invention thus also includes a machine readable medium, which may include instructions used to program a processor to perform a method according to the embodiments of the present invention. This medium may include, but is not limited to, any type of disk including floppy disk, optical disk, and CD-ROMs.

It may be understood that the structure of the software used to implement the embodiments of the invention may take any desired form, such as a single or multiple programs. It may be further understood that the method of an embodiment of the present invention may be implemented by software, hardware, or a combination thereof.

The above is a detailed discussion of the preferred embodiments of the invention. The full scope of the invention to which applicants are entitled is defined by the claims hereinafter. It is intended that the scope of the claims may cover other embodiments than those described above and their equivalents.

What is claimed is:

1. A method comprising:
    on a semiconductor chip, selecting in which one of a first ring structure and a second ring structure to send packets from a source node to a destination node, wherein the first ring structure transmits packets in a first direction and the second ring structure transmits packets in a second direction, opposite to the first direction;
    calculating a distance in terms of clock cycles between the source node and the destination node on the selected direction; and
    sending the packets on the selected direction during clock cycles having a select parity based on a parity of the calculated distance.

2. The method of claim 1, wherein the first and second ring structures comprise a bidirectional ring structure.

3. The method of claim 1, wherein the first direction is clockwise and the second direction is counterclockwise.

4. The method of claim 1,
    wherein the selecting comprises selecting a direction having less nodes to traverse.

5. The method of claim 1, wherein the sending comprises:
    sending the packets during an even-numbered clock cycle if the calculated distance is an even number and the selected direction is clockwise; and
    sending the packets during an odd-numbered clock cycle if the calculated distance is an even number and the selected direction is counterclockwise.

6. The method of claim 1, wherein the sending comprises:
    sending the packets during an odd-numbered clock cycle if the calculated distance is an odd number and the selected direction is clockwise; and
    sending the packets during an even-numbered clock cycle if the calculated distance is an odd number and the selected direction is counterclockwise.

7. The method of claim 1, wherein the sending comprises:
    sending the packets from a first queue in the first direction during an even-numbered clock cycle;
    sending the packets from a second queue in the first direction during an odd-numbered clock cycle;
    sending the packets from a third queue in the second direction during the even-numbered clock cycle; and
    sending the packets from a fourth queue in the second direction during the odd-numbered clock cycle.

8. The method of claim 7,
    wherein the first queue is to hold packets to send to the destination node that is an even distance away on the first ring structure;
    wherein the second queue is to hold packets to send to the destination node that is an odd distance away on the first ring structure;
    wherein the third queue is to hold packets to send to the destination node that is an even distance away on the second ring structure; and
    wherein the fourth queue is to hold packets to send to the destination node that is an odd distance away on the second ring structure.

9. The method of claim 1, wherein the clock cycle is an even-numbered clock cycle or an odd-numbered clock cycle.

10. A method comprising:
    polling a first ring structure during the even-numbered clock cycles;
    polling a second ring structure during the odd-numbered clock cycles;
    receiving packets at a node from on the first ring structure on a semiconductor chip during an even-numbered clock cycles; and
    receiving packets at the node on the second ring structure on the semiconductor chip during an odd-numbered clock cycles, wherein a single packet is received during each clock cycle.

11. The method of claim 10, wherein the first ring structure is to transport the packets in a first direction and the second ring structure is to transport the packets in a second direction.

12. The method of claim 11, wherein the first direction is clockwise and the second direction is counterclockwise.

13. The method of claim 11, wherein the first direction is counterclockwise and the second direction is clockwise.

14. The method of claim 10, wherein the first and second ring structures form a bidirectional ring interconnect.

15. A method comprising:
   selecting one of a clockwise ring structure and a counterclockwise ring structure on a semiconductor chip on which to transport a packet from a source node to a destination node;
   calculating a distance in terms of clock cycles between the source node and the destination node on the selected ring structure;
   determining parity of the calculated distance;
   sending the packet from the source node to the destination node during a first clock cycle based on the parity of the determined distance; and
   receiving the packet at the destination node during a second clock cycle based on the selected ring structure.

16. The method of claim 15, wherein the first clock cycle comprises an even-numbered clock cycle and an odd-numbered clock cycle, and the second clock cycle comprises an even-numbered clock cycle and an odd-numbered clock cycle.

17. The method of claim 15, wherein the sending comprises:
   sending the packet during an even-numbered cycle if the calculated distance is an even number and the selected ring structure is the clockwise ring structure;
   sending the packet during an odd-numbered clock cycle if the calculated distance is an even number and the selected ring structure is the counterclockwise ring structure;
   sending the packet during an odd-numbered clock cycle if the calculated distance is an odd number and the selected ring structure is the clockwise ring structure; and
   sending the packet during an even-numbered clock cycle if the calculated distance is an odd number and the selected ring structure is the counterclockwise ring structure.

18. The method of claim 15, wherein the receiving comprises:
   receiving the packet during an even-numbered clock cycle if the selected ring structure is the clockwise ring structure; and
   receiving the packet during an odd-numbered clock cycle if the selected ring structure is the counterclockwise ring structure.

19. A semiconductor chip comprising:
   a first ring structure to send packets in a first direction;
   a second ring structure to send the packets in a second direction, opposite to the first direction; and
   a plurality of nodes coupled to the first and second ring structures, the first and second ring structures to send the packets to a destination node during selected clock cycles based on a parity of a computed distance in terms of clock cycles to the destination node in a selected direction.

20. The semiconductor chip of claim 19, wherein the first direction is clockwise and the second direction is counterclockwise.

21. The semiconductor chip of claim 19, wherein each node comprises:
   a subtractor to compute the distance to the destination node.

22. The semiconductor chip of claim 19, wherein each node comprises:
   a programmable finite state machine programmed to compute the distance to the destination node.

23. The semiconductor chip of claim 19, wherein each node comprises:
   a processor to:
      select on which of the first and second ring structures to transport the packets,
      compute the computed distance in terms of clock cycles to the destination node on the selected ring structure, and
      determine the parity of the computed distance; and
   a plurality of queues to selectively hold the packets prior to transport based on the determined distance and the selected ring structure.

24. The semiconductor chip of claim 23,
   wherein a first of the plurality of queues is to hold the packets to be sent on the first ring structure if the determined distance is an even number;
   wherein a second of the plurality of queues is to hold the packets to be sent on the first ring structure if the determined distance is an odd number;
   wherein a third of the plurality of queues is to hold the packets to be sent on the second ring structure if the determined distance is an even number; and
   wherein a fourth of the plurality of queues is to hold the packets to be sent on the second ring structure if the determined distance is an odd number.

25. The semiconductor chip of claim 24, each node further comprising:
   a first multiplexor to select one of the first and second queues to send the packets on the first ring structure in response to an even-numbered or odd-numbered clock cycle; and
   a second multiplexor to select one of the third and fourth queues to send the packets on the second ring structure in response to the even-numbered or odd-numbered clock cycle.

26. The semiconductor chip of claim 25, each node further comprising:
   a third multiplexor to select the packets from the first multiplexor or other packets already on the first ring structure to send to the destination node.

27. The semiconductor chip of claim 25, each node further comprising:
   a fourth multiplexor to select the packets from the second multiplexor or other packets already on the second ring structure to send to the destination node.

28. The semiconductor chip of claim 23, wherein the processor is further to:
   determine whether to send the packets during an even-numbered or odd-numbered clock cycle on the selected ring structure.

29. The semiconductor chip of claim 23, wherein the processor is further to:
   determine whether to receive the packets during an even-numbered clock cycle or during an odd-numbered clock cycle;
   determine on which of the first and second ring structures to receive the packets based on the determined clock cycle; and
   poll the determined ring structure for the packets during the determined clock cycle.

30. A system comprising:
   a multiprocessor chip including
      a plurality of nodes, and
      a plurality of ring structures coupled to the nodes to transport packets from a source node to a destination node during a clock cycle based on a parity of a computed distance in terms of clock cycles between the source node and the clock node, a first of the plurality of ring structures to transport the packets in a first direction and a second of the plurality of ring structures to transport the packets in a second direction opposite to the first direction; and a bus coupled to the multiprocessor chip.

31. The system of claim 30, wherein the first direction is clockwise and the second direction is counterclockwise.

32. The system of claim 30, wherein the first direction is counterclockwise and the second direction is clockwise.

33. The system of claim 30, wherein at least one of the nodes is a bus interface to receive the packets on the first of the plurality of ring structures during an even-numbered clock cycle and on the second of the plurality of ring structures during an odd-numbered clock cycle and to transport the packets to the bus one clock cycle thereafter.

34. The system of claim 33, wherein each node is to receive no more than one packet per clock cycle.

35. A machine readable medium having stored thereon a plurality of executable instructions to perform a method comprising:
  selecting one of a clockwise ring structure and a counterclockwise ring structure on a semiconductor chip on which to transport a packet from a source node to a destination node;
  calculating a distance in terms of clock cycle between the source node and the destination node on the selected ring structure;
  determining a parity of the calculated distance;
  sending the packet from the source node to the destination node during a first clock cycle based on the parity of the determined distance; and
  receiving the packet at the destination node during a second clock cycle based on the selected ring structure.

36. The machine readable medium of claim 35, wherein the first clock cycle comprises an even-numbered clock cycle and an odd-numbered clock cycle, and the second clock cycle comprises an even-numbered clock cycle and an odd-numbered clock cycle.

37. The machine readable medium of claim 35, wherein the sending comprises:
  sending the packet during an even-numbered cycle if the calculated distance is an even number and the selected ring structure is the clockwise ring structure;
  sending the packet during an odd-numbered clock cycle if the calculated distance is an even number and the selected ring structure is the counterclockwise ring structure;
  sending the packet during an odd-numbered clock cycle if the calculated distance is an odd number and the selected ring structure is the clockwise ring structure; and
  sending the packet during an even-numbered clock cycle if the calculated distance is an odd number and the selected ring structure is the counterclockwise ring structure.

38. The machine readable medium of claim 35, wherein the receiving comprises:
  receiving the packet during an even-numbered clock cycle if the selected ring structure is the clockwise ring structure; and
  receiving the packet during an odd-numbered clock cycle if the selected ring structure is the counterclockwise ring structure.

39. A machine readable medium having stored thereon a plurality of executable instructions to perform a method comprising:
  on a semiconductor chip, selecting in which one of a first ring structure and a second ring structure to send packets from a source node to a destination node, wherein the first ring structure transmits packets in a first direction and the second ring structure transmits packets in a second direction, opposite to the first direction;
  calculating a distance in terms of clock cycles between the source node and the destination node on the selected direction; and
  sending the packets on the selected direction, during clock cycles having a select parity based on a parity of the calculated distance.

40. The machine readable medium of claim 39, wherein the selecting comprises selecting a direction having less nodes to traverse.

41. The machine readable medium of claim 39, wherein the sending comprises:
  sending the packets during an even-numbered clock cycle if the calculated distance is an even number and the selected direction is clockwise; and
  sending the packets during an odd-numbered clock cycle if the calculated distance is an even number and the selected direction is counterclockwise.

42. The machine readable medium of claim 39, wherein the sending comprises:
  sending the packets during an odd-numbered clock cycle if the calculated distance is an odd number and the selected direction is clockwise; and
  sending the packets during an even-numbered clock cycle if the calculated distance is an odd number and the selected direction is counterclockwise.

* * * * *